(12) United States Patent
Yada

(10) Patent No.: US 11,609,520 B2
(45) Date of Patent: Mar. 21, 2023

(54) HEATING DEVICE HAVING AN AC VOLTAGE ABNORMALITY DETECTOR AND IMAGE FORMING APPARATUS

(71) Applicant: Brother Kogyo Kabushiki Kaisha, Nagoya (JP)

(72) Inventor: Naoya Yada, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/412,333

(22) Filed: Aug. 26, 2021

(65) Prior Publication Data

US 2022/0066358 A1 Mar. 3, 2022

(30) Foreign Application Priority Data

Aug. 31, 2020 (JP) .............................. JP2020-146284

(51) Int. Cl.
| | | |
|---|---|---|
| *G03G 15/20* | (2006.01) | |
| *H02H 3/00* | (2006.01) | |
| *G03G 15/00* | (2006.01) | |
| *H02H 3/50* | (2006.01) | |
| *H02H 3/02* | (2006.01) | |

(52) U.S. Cl.
CPC ....... *G03G 15/205* (2013.01); *G03G 15/5004* (2013.01); *G03G 15/80* (2013.01); *H02H 3/021* (2013.01); *H02H 3/50* (2013.01)

(58) Field of Classification Search
CPC ............ G03G 15/205; G03G 15/2039; G03G 15/5004; G03G 15/80; H02H 3/021; H02H 3/023; H02H 3/50; H05B 3/0066

USPC ................................ 399/33, 69, 88; 219/216
See application file for complete search history.

(56) References Cited

U.S. PATENT DOCUMENTS

| | | | | |
|---|---|---|---|---|
| 2002/0114638 A1* | 8/2002 | Kinoshita | .......... | G05D 23/1917 399/69 |
| 2005/0146824 A1* | 7/2005 | Borrego Bel | ............ | H02H 5/04 361/103 |
| 2009/0034142 A1* | 2/2009 | Ushiro | .................... | G03G 15/80 361/104 |
| 2011/0058288 A1* | 3/2011 | Vanko | ..................... | H02P 23/26 361/33 |

(Continued)

FOREIGN PATENT DOCUMENTS

JP 2015-173001 A 10/2015

*Primary Examiner* — Robert B Beatty
(74) *Attorney, Agent, or Firm* — Burr Patent Law, PLLC

(57) ABSTRACT

A heating device includes a heater, an AC-voltage input section between which an AC voltage is applied, a fuse, a switcher, an AC-voltage-abnormality detector configured to detect an abnormality of the AC voltage, a controller. The controller is configured to execute a current-flowing operation in a state in which connection of a first connection terminal to a second connection terminal is a non-connecting state. The current-flowing operation is an operation in which an electrical current flows through the heater. The controller is configured to execute a connecting process in response to detection of the abnormality of the AC voltage by the AC-voltage-abnormality detector detected in the middle of the current-flowing operation. The connecting process is a process of switching a connection of a first connecting point to a second connecting point from a non-connecting state to a connecting state.

11 Claims, 11 Drawing Sheets

(56) References Cited

U.S. PATENT DOCUMENTS

| | | | |
|---|---|---|---|
| 2013/0136467 A1* | 5/2013 | Naganawa | G03G 15/5087 399/37 |
| 2014/0044447 A1* | 2/2014 | Jeong | G03G 15/2039 363/78 |
| 2014/0198337 A1* | 7/2014 | Nakajima | G03G 15/5004 358/1.14 |
| 2018/0145498 A1* | 5/2018 | Handy | H02H 3/023 |
| 2018/0314196 A1* | 11/2018 | Kojima | G03G 15/0865 |
| 2020/0379393 A1* | 12/2020 | Nakazawa | G03G 15/55 |

* cited by examiner

HEATING DEVICE HAVING AN AC VOLTAGE ABNORMALITY DETECTOR AND IMAGE FORMING APPARATUS

CROSS REFERENCE TO RELATED APPLICATION

The present application claims priority from Japanese Patent Application No. 2020-146284, which was filed on Aug. 31, 2020, the disclosure of which is herein incorporated by reference in its entirety.

BACKGROUND

The following disclosure relates to a heating device and an image forming apparatus.

There has been a conventional image forming apparatus including a heating device. In the image forming apparatus, to prevent an abnormal temperature rising of the heater in a state in which a turn-off of a triac which controls heat of the heater cannot be executed, when an abnormality of power is detected, an electrical current flowing to a heater of the heating device is interrupted by a relay.

In a failure of an inverter device, when a DC voltage is output and applied to the heating device, an arc discharge occurs and a contact of the relay is welded by the arc discharge even though the relay contact is tried to be open. In this situation, there is a risk that the flow of the electrical current to the heater cannot be interrupted by the relay. To solve this problem, in the conventional image forming apparatus, a fuse is connected in parallel with the relay. When the DC voltage supplied from a power supply is detected, the relay is switched to open and the electrical current flows into the fuse. As a result, this configuration prevents the electrical current from continuously flowing to the heater by fusing and cutting the fuse.

SUMMARY

In the heating device of the conventional image forming apparatus, however, there is a problem that it is not always easy to set a setting of a fuse that satisfies a condition in which the fuse is fused and cut in an abnormal state of the AC voltage and the fuse is not fused and cut in a normal state of the AC voltage.

An aspect of the disclosure relates to a heating device and an image forming apparatus capable of stopping an electrical current flowing to a heater by fusing and cutting a fuse securely in an occurrence of an abnormality of the AC voltage.

In one aspect of the disclosure, a heating device includes: a heater disposed between a first terminal and a second terminal and configured to generate heat by an electrical current flowing between the first terminal and the second terminal; an AC-voltage input section having a first input-terminal and a second input-terminal between which an AC voltage is applied; a fuse disposed between the first terminal and the first input-terminal; a switcher disposed between a first connecting point and a second connecting point and configured to switch connection of the first connecting point to the second connecting point between a connecting state and a non-connecting state, the first connecting point being located between the first terminal of the heater and the fuse, the second connecting point being located between the second terminal of the heater and the second-input terminal; an AC-voltage-abnormality detector configured to detect an abnormality of the AC voltage; and a controller configured to execute a current-flowing operation in a state in which the connection of the first connection terminal to the second connection terminal is the non-connecting state, the current-flowing operation being an operation in which the electrical current flows through the heater. The controller is configured to execute a connecting process in response to detection of the abnormality of the AC voltage by the AC-voltage-abnormality detector detected in the middle of the current-flowing operation, the connecting process being a process of switching the connection of the first connecting point to the second connecting point from the non-connecting state to the connecting state.

In another aspect of the disclosure, an image forming apparatus includes: a process unit configured to form a developer image on a recorded medium based on image data; a heating device including a heater disposed between a first terminal and a second terminal and configured to generate heat by an electrical current flowing between the first terminal and the second terminal; an AC-voltage input section having a first input-terminal and a second input-terminal between which an AC voltage is applied; a fuse disposed between the first terminal and the first input-terminal; a switcher disposed between a first connecting point and a second connecting point and configured to switch connection of the first connecting point to the second connecting point between a connecting state and a non-connecting state, the first connecting point being located between the first terminal of the heater and the fuse, the second connecting point being located between the second terminal of the heater and the second-input terminal; an AC-voltage-abnormality detector configured to detect an abnormality of the AC voltage; and a controller; and a fixing device configured to fix the developer image formed by the process unit on the recorded medium by heat generated by the heating device. The controller is configured to execute a current-flowing operation in a state in which the connection of the first connection terminal to the second connection terminal is the non-connecting state, the current-flowing operation being an operation in which the electrical current flows through the heater. The controller is configured to execute a connecting process in response to detection of the abnormality of the AC voltage by the AC-voltage-abnormality detector detected in the middle of the current-flowing operation, the connecting process being a process of switching the connection of the first connecting point to the second connecting point from the non-connecting state to the connecting state.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

First Embodiment

Figure 1:
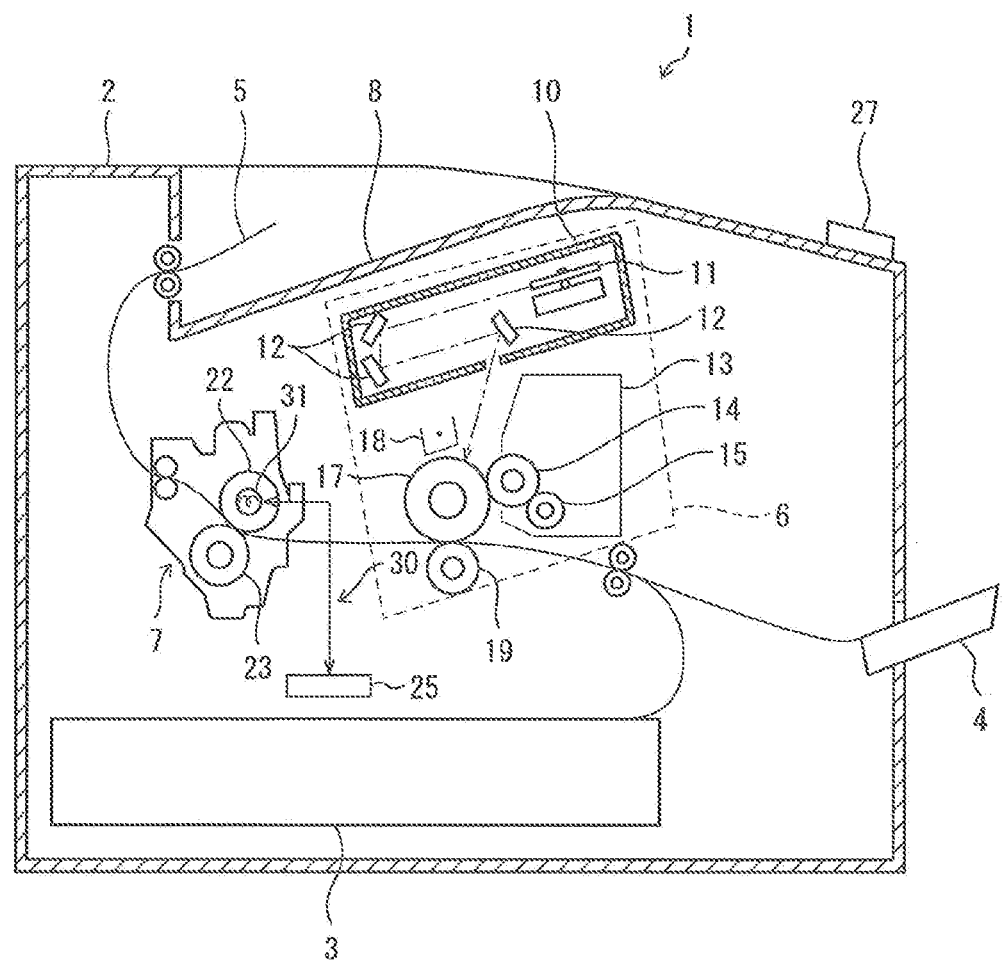
FIG. 1 is a cross-sectional view schematically illustrating a structure of an image forming apparatus according to a first embodiment.

There will be described a first embodiment of this disclosure in detail. Configuration of Image Forming Apparatus FIG. 1 is a view schematically illustrating a vertical section of an image forming apparatus 1.

The image forming apparatus 1 forms a toner image, in a process unit 6, on a sheet 5 conveyed from a tray 3 positioned at a lower part of an inner space of a main housing 2 or conveyed from a manual feed tray 4. Then, the image forming apparatus 1 executes a fixing process, in a fixing device 7, by heating the sheet 5 on which the toner image is formed. Finally, the image forming apparatus 1 discharges the sheet 5 to a discharge tray 8 positioned at an upper part of the inner space of the main housing 2 by a discharge roller.

The process unit 6 comprises a scanner unit 10, a developing cartridge 13, a photoconductor drum 17, a charger 18, a transfer device 19, and the like.

The scanner unit 10 is disposed at an upper part of an inner space of the main housing 2. The scanner unit 10 comprises a laser light emitter (not shown), a polygon mirror 11, a plurality of reflecting mirrors 12, a plurality of lenses (not shown), and the like. In the scanner unit 10, a laser beam emitted from the laser light emitter is applied to a surface of the photoconductor drum 17 through the polygon mirror 11, the reflecting mirrors 12 and the lenses by high speed scanning, as indicated by a dot and dash line.

The developing cartridge 13 is mounted on the main housing 2 so as to be attachable to and removable from the main housing 2. The developing cartridge 13 stores toner in an inner space of the developing cartridge 13. A developing roller 14 and a supply roller 15 are disposed at a toner supply port of the developing cartridge 13 in a state in which the developing roller 14 and the supply roller 15 are opposed to each other. The toner stored in the developing cartridge 13 is supplied to the developing roller 14 by rotation of the supply roller 15 and the toner is carried by the developing roller 14.

The charger 18 is disposed above the photoconductor drum 17 and spaced apart from the photoconductor drum 17. The transfer device 19 is disposed under the photoconductor drum 17 in a state in which the transfer device 19 and the photoconductor drum 17 are opposed to each other. First, a surface of the photoconductor drum 17 is uniformly, for example, charged positively by the charger 18 while the photoconductor 17 rotates. Secondly, an electrostatic latent image is formed on the photoconductor drum 17 by the laser beam emitted from the scanner unit 10.

Then, while the photoconductor drum 17 rotates in a state in which the photoconductor 17 is in contact with the developing roller 14, the toner carried by the developing roller 14 is supplied to the electrostatic latent image on the photoconductor drum 17. The toner supplied from the developing roller 14 is carried by the photoconductor drum 17 such that a toner image is formed on the photoconductor drum 17. Subsequently, the toner image is transferred onto the sheet 5 by a transfer bias applied to the transfer device 19 while the sheet 5 passes through between the photoconductor drum 17 and the transfer device 19.

The fixing device 7 is disposed downstream of the process unit 6 in a conveying direction of the sheet. The fixing device 7 comprises a fixing roller 22, a pressure roller 23 which presses the fixing roller 22, a heater 31 which heats the fixing roller 22, and the like. The heater 31 is connected to the circuit board 25, and an electrical current flowing through the heater 31 is controlled by a signal from the circuit board 25. The heating device 30 comprises the heater 31 and the circuit board 25. The image forming apparatus 1 comprises a display 27 configured to display printing information and the like.

1. Configuration of Heating Device

Figure 2:
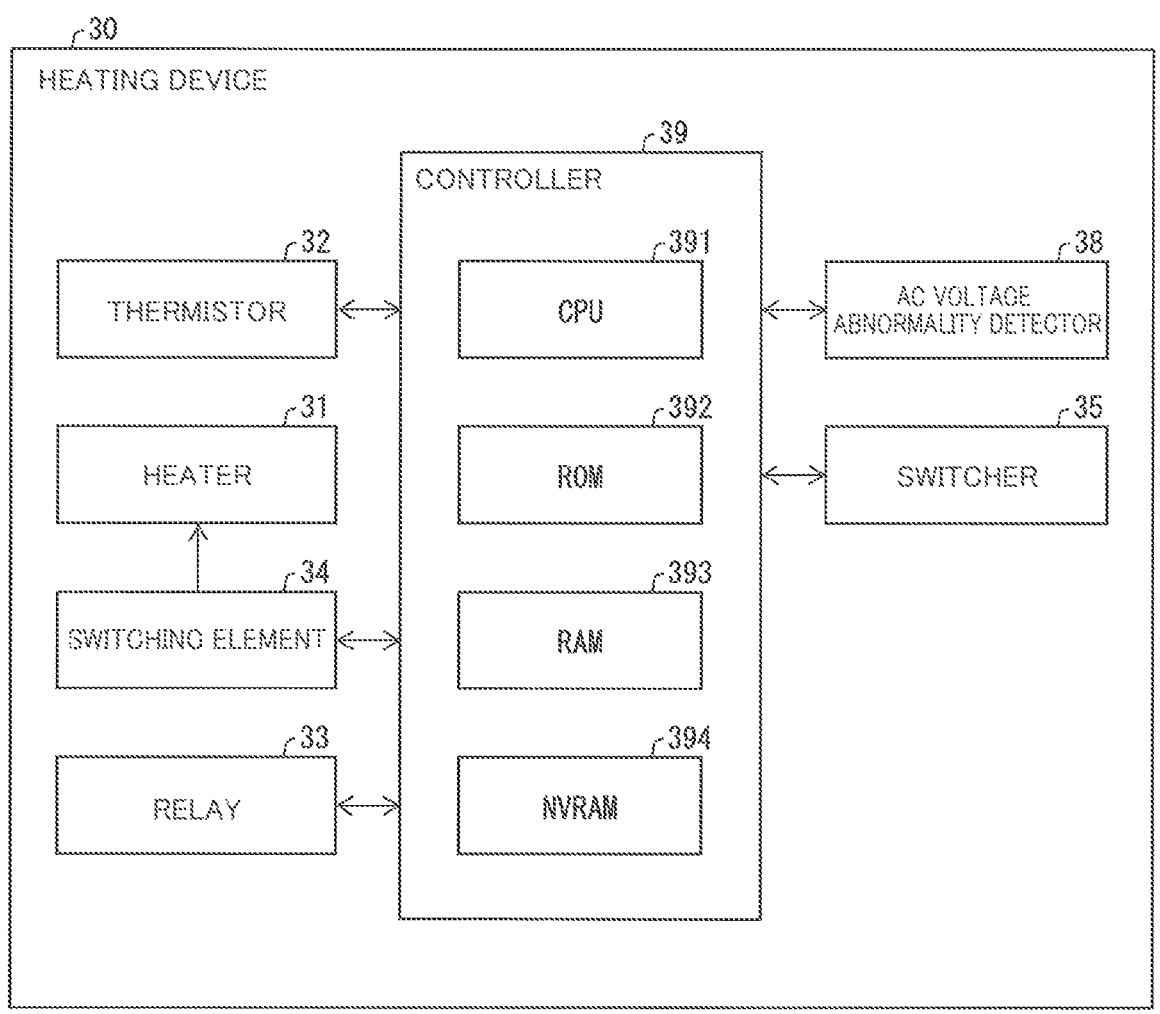
FIG. 2 is a functional block diagram schematically illustrating a structure of a heating device according to the first embodiment.
Figure 3:
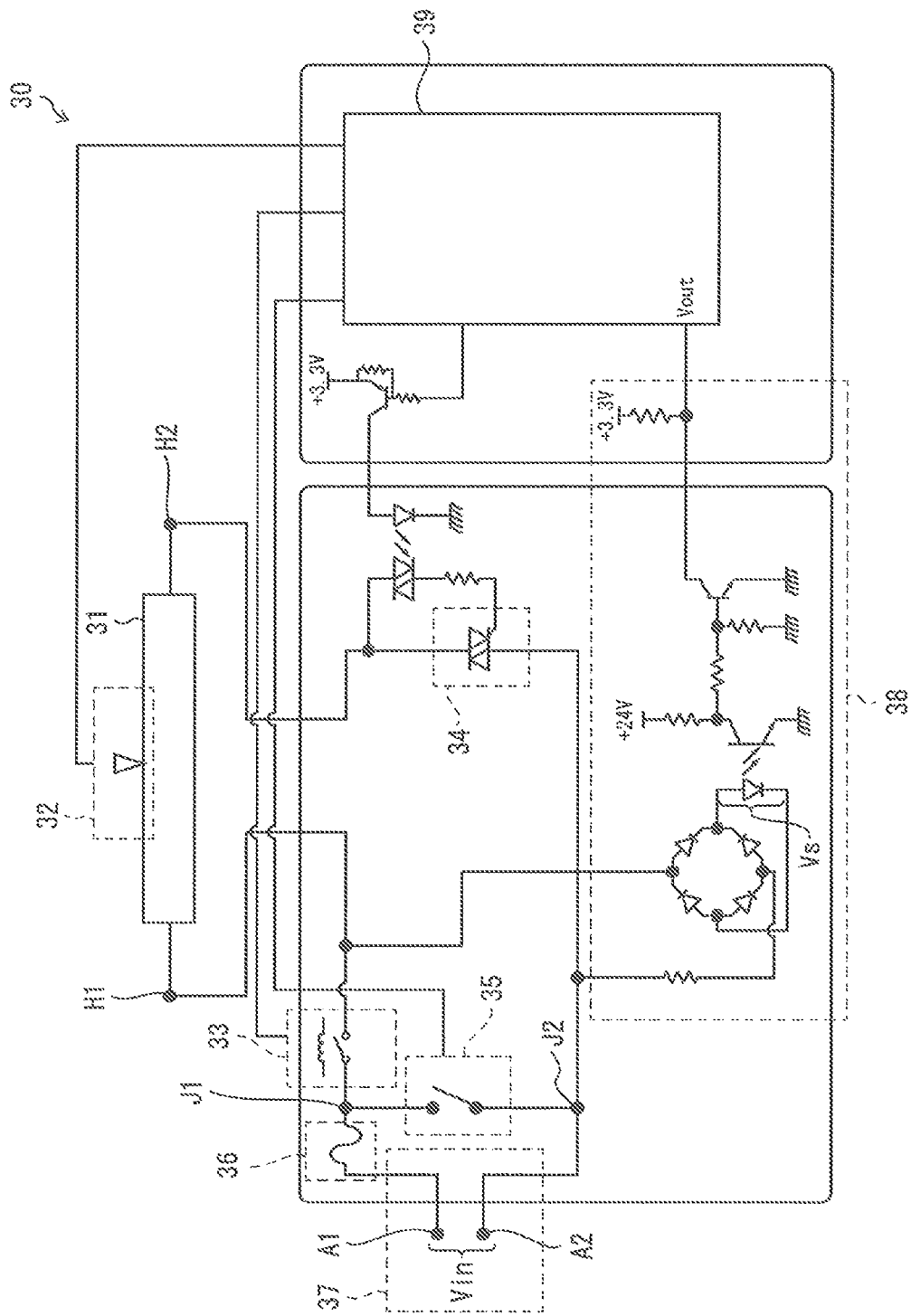
FIG. 3 is a circuit diagram of the heating device according to the first embodiment.

FIG. 2 is a functional block diagram schematically illustrating a configuration of a heating device 30. FIG. 3 illustrates a circuit diagram of the heating device 30. As illustrated in FIGS. 2 and 3, the heating device 30 comprises the heater 31, a thermistor 32, a controller 39, a switching element 34, a relay 33, a switcher 35, an AC voltage abnormality detector 38. Further, as illustrated in FIG. 3, the heating device 30 comprises an AC voltage input section 37 to which an electrical power is applied and a fuse 36 configured to interrupt an electrical current flowing to the heater 31. The controller 39, the switching element 34, the relay 33, the switcher 35, and the AC voltage abnormality detector 38 are disposed on the circuit board 25 illustrated in FIG. 1.

As illustrated in FIG. 2, the controller 39 comprises a CPU 391 (Central Processing Unit), a ROM 392 (Read Only Memory), a RAM 393 (Random Access Memory), a NVRAM 394 (non-transitory RAM). The ROM 392 stores various kinds of control programs and various settings, various default values for control the heating device 30, especially, programs such as a heater control process, tables for executing the heater control process, and the like.

As illustrated in FIG. 2, the RAM 393 and the NVRAM 394 are used as operation areas from which various control programs are read, or as storage areas into which data is temporary stored. The CPU 391 controls various constituent elements of the heating device 30 in accordance with the various control programs read from the ROM 392 while storing results of the various control programs into the RAM 393 or the NVRAM 394.

As illustrated in FIG. 3, the AC voltage input section 37 receives an electric power from an AC power supply (not shown) located outside of the heating device 30. The AC power input 37 supplies the AC voltage to an inside of the heating device 30. The AC voltage input section 37 consists of a first input terminal A1 and a second input terminal A2. One of two terminals of the AC power supply is connected to the first input terminal A1, and the other of the two terminals of the AC power supply is connected to the second input terminal A2.

As illustrated in FIG. 3, in the heating device 30, the fuse 36, the relay 33, the heater 31 and the switching element 34 are arranged in this order and connected in series between the first input terminal A1 and the second input terminal A2. A first connecting point J1 is disposed between the fuse 36 and the relay 33. A second connecting point J2 is disposed between the switching element 34 and the second input terminal A2.

The heater 31 functions as a heating function in which the heater 31 heats the fixing roller 22 constituting the fixing device 7. The heater 31 is stored inside of the fixing roller 22 in a state in which a longitudinal direction of the heater 31 extends in a direction in which a central axis of the fixing roller 22 extends. Examples of the heater 31 include a halogen heater. The heater 31 comprises a first terminal H1 and a second terminal H2. The first terminal H1 is a terminal disposed closer to the relay 33 than to the switching element 34, and the second terminal H2 is a terminal disposed closer to the switching element 34 than to the relay 33. In other words, the first terminal H1 is located at a terminal of a first side of the heater 31 connected to the relay 33, and the second terminal H2 is located at a terminal of a second side of the heater 31 connected to the switching element 34. The heater 31 generates heat by an electrical current flowing between the first terminal H1 and the second terminal H2. The heater 31 heats the fixing roller 22 constituting the fixing device 7, and the heater 31 fixes toner on the sheet 5.

The thermistor 32 is disposed near the heater 31. The thermistor 32 detects a temperature of the heater 31 and outputs the detected temperature information to the controller 39. The fuse 36 disposed between the first input terminal A1 of the AC voltage input section 37 and the first connecting point J1 is set to a setting in which the fuse 36 fuses and cuts when an electric current more than a rated current flows to the heating device 30.

The switching element 34 disposed between the second terminal H2 and the second connecting point J2 performs switching operation of the AC voltage applied to the heater 31 based on an instruction from the controller 39. Examples of the switching element 34 include a triac. The triac is a semiconductor device and also a switching element configured to switch the AC voltage indicating a voltage waveform including positive polarity and negative polarity.

As illustrated in FIG. 3, the AC voltage abnormality detector 38 is a zero crossing detector circuit. The AC voltage abnormality detector 38 is disposed between the first terminal H1 of the heater 31 and the second connecting point J2, and the AC voltage abnormality detector 38 is connected in parallel with the heater 31. An input voltage Vin is a power supply voltage applied to between the first input terminal A1 and the second input terminal A2 of the AC voltage input section 37. As described later, when the input voltage Vin is applied to the AC voltage input section 37, the AC voltage abnormality detector 38 outputs a characteristic waveform in accordance with the input voltage Vin as an output signal voltage Vout of the AC voltage abnormality detector 38. The output signal voltage Vout is a zero crossing signal output from the zero crossing detector circuit.

The AC voltage abnormality detector 38 outputs voltage waveforms respectively corresponding to (a) in a case where the input voltage Vin is the AC voltage, (b) in a case where the input voltage Vin is a rectangular wave AC voltage, and (c) in a case where the input voltage Vin is a DC voltage. Accordingly, the controller 39 can determine which voltage is applied to the AC voltage input section 37 by identifying the voltage waveform of the output signal voltage Vout.

The relay 33 disposed between the first connecting point J1 and the first terminal H1 of the heater 31 has a function capable of flowing a current to the heater 31 and interrupting the current to the heater 31 based on an instruction from the controller 39. Examples of the relay 33 include a relay having a contact.

The switcher 35 is disposed between the first connecting point J1 and the second connecting point J2. The switcher 35 has a function in which the switcher 35 short-circuits between the first connecting point J1 and the second connecting point J2 based on an instruction from the controller 39. When between the first connecting point J1 and the second connecting point J2 is short-circuited by the switcher 35, an electrical current supplied from the power supply which is connected to the AC voltage input section 37 flows through the switcher 35 having an extremely low resistance. Accordingly, a large electrical current flows through the fuse 36, and the fuse 36 fuses and cuts. Examples of the switcher 35 include a relay.

The controller 39 executes a predetermined switching operation in which the triac (the switching element 34) is turned on through a conventional circuit using a triac coupler, as a heater control process. The controller 39 controls the opening and closing of the relay 33 and the switcher 35. At this time, the controller 39 controls the relay 33 and the switcher 35 based on the temperature information of the heater 31 detected by the thermistor 32 and the output signal voltage Vout detected by the AC voltage abnormality detector 38.

2. Circuit Operation of AC Voltage Abnormality Detector

In some areas where a power supply by a commercial power supply system is not always stable, there is a case in which a power supply having an inverter device is used for backup of a commercial power supply, as a power supply for supplying the power to the image forming apparatus 1. Originally, the voltage applied to the AC voltage input section 37 is a sinusoidal wave AC voltage at commercial frequencies, however, a DC voltage or a rectangular wave AC voltage having abrupt rising edges can be applied to the AC voltage input section 37 due to an error of setting of the inverter device or a failure of the inverter device. The AC voltage abnormality detector 38 is a circuit for detecting these abnormalities of the voltage applied to the AC voltage input section 37.

A circuit configuration of the zero crossing detector circuit as the AC voltage abnormality detector 38 is illustrated in FIG. 3. At a timing when an absolute value of the voltage become less than a threshold voltage Vth, the zero crossing detector circuit outputs a zero crossing signal switched from a High level to a Low level. The AC voltage abnormality detector 38 comprises a rectifier circuit, a photo-coupler and a transistor. The input voltage Vin becomes a rectified signal Vs which is full-wave rectified by the rectifier circuit. The rectified signal Vs is a signal output from the rectifier circuit based on the input voltage Vin as an input signal. The rectified signal Vs is converted to an optical signal by a light-emitting diode of the photo-coupler.

In a case where the rectified signal Vs is equal to or greater than the threshold voltage Vth, a light receiving element of the photo-coupler reacts to the optical signal of the light-emitting diode of the photo-coupler, and an electrical current flows through the light receiving element. When the electrical current flows through the photo-coupler, an electrical current does not flow between an emitter and a collector of the transistor, and the output signal voltage Vout with the High level is transmitted to the controller 39. By contrast, in a case where the rectified signal Vs is less than the threshold voltage Vth, the receiving element of the photo-coupler does not react to the optical signal of the light-emitting diode of the photo-coupler, and the electrical current does not flow through the light receiving element. As a result of this, an electrical current flows to a base of the transistor, and the electrical current flows between the emitter and the corrector. Accordingly, the output signal voltage Vout with the Low level is transmitted to the controller 39.

Figure 4:
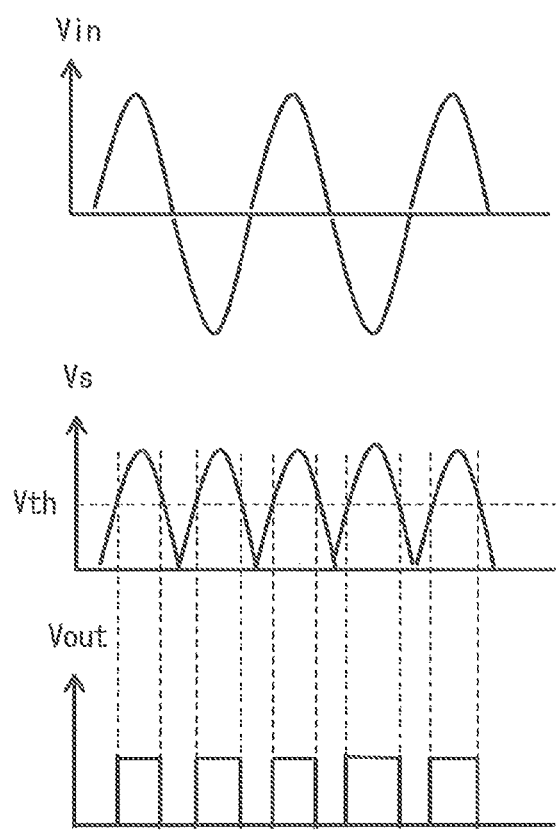
FIG. 4 illustrates waveform diagrams indicating a rectified signal Vs of a rectifier circuit of an AC voltage abnormality detector and an output signal voltage Vout of the AC voltage abnormality detector in a case where an input voltage Vin input to an AC voltage input section is a sinusoidal voltage wave.
Figure 5:
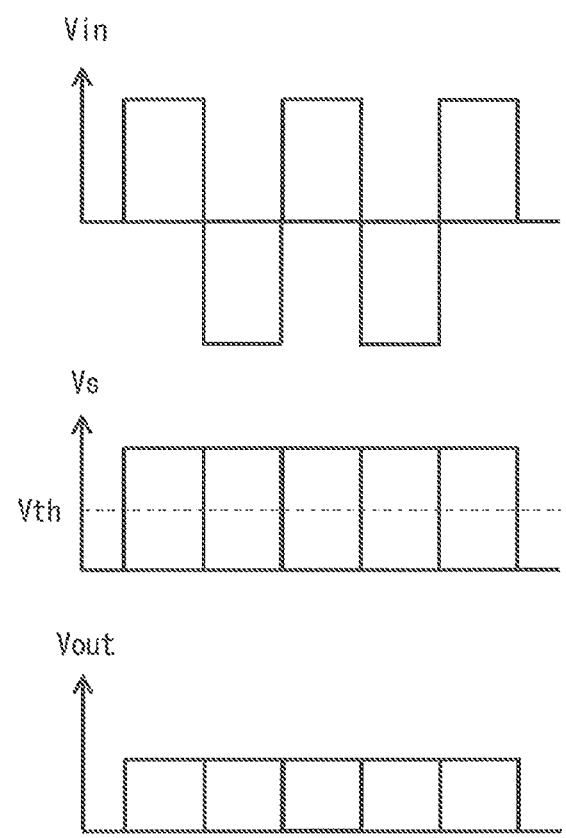
FIG. 5 illustrates waveform diagrams indicating the rectified signal Vs of the rectifier circuit of the AC voltage abnormality detector and the output signal voltage Vout of the AC voltage abnormality detector in a case where the input voltage Vin input to the AC voltage input section is a rectangular wave voltage.
Figure 6:
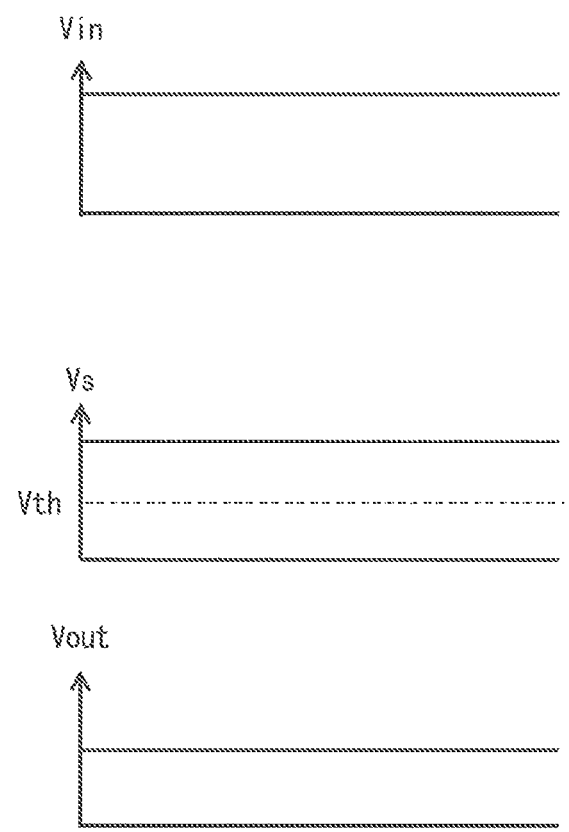
FIG. 6 illustrates waveform diagrams indicating the rectified signal Vs of the rectifier circuit of the AC voltage abnormality detector and the output signal voltage Vout of the AC voltage abnormality detector in a case where the input voltage Vin input to the AC voltage input section is a DC voltage.

FIGS. 4, 5 and 6 illustrate output waveforms which occur when various input voltages are applied to the AC voltage abnormality detector 38.

FIG. 4 illustrates a waveform of the rectified signal Vs of the rectifier circuit and a waveform of the output signal voltage Vout of the AC voltage abnormality detector 38 which occur when the input voltage Vin is a sinusoidal wave. The rectified signal Vs is a waveform which is full-wave rectified from the input voltage. A dashed line extending in a horizontal direction in the waveform diagram of the rectified signal Vs indicates the threshold voltage Vth at which the photo-coupler operates. When the rectified signal Vs is less than the threshold voltage Vth, the electrical current does not flow through the photo-coupler. When the rectified signal Vs becomes a voltage equal to or greater than the threshold voltage Vth, the electrical current flows through the photo-coupler.

As a result of this, the AC voltage abnormality detector 38 outputs, as the output signal voltage Vout, pulse signals having a duty ratio which is less than a predetermined value. The output signal voltage Vout with the pulse signals having the duty ratio less than the predetermined value indicates that the voltage applied to the AC voltage input section 37 is normal.

FIG. 5 illustrates a waveform of the rectified signal Vs of the rectifier circuit and a waveform of the output signal voltage Vout of the AC voltage abnormality detector 38 which occur when the input voltage Vin is a rectangular wave AC voltage. In this case, since a rising speed of the rectangular wave AC voltage of the rectified signal Vs from zero is high, a period starting from a timing when the rectangular wave AC voltage of the rectified signal Vs rises from zero to a timing when the rectangular wave AC voltage of the rectified signal Vs reaches the threshold voltage Vth at which the photo-coupler turns on is extremely short.

As a result of this, the output signal voltage Vout of the AC voltage abnormality detector 38 becomes pulse signals having a duty ratio which is approximately equal to 1. The output signal voltage Vout having the pulse signals having the duty ratio approximately equal to 1 indicates that the voltage applied to the AC voltage input section 37 is abnormal.

FIG. 6 illustrates a waveform of the rectified signal Vs of the rectifier circuit and a waveform of the output signal voltage Vout of the AC voltage abnormality detector 38 which occur when the input voltage Vin is a DC voltage. In this case, the rectified signal Vs of the rectifier circuit indicates the DC voltage. Since a voltage greater than the threshold voltage Vth at which the photo-coupler operates is always applied to the photo-coupler, the photo-coupler is always in an ON state.

As a result of this, the DC voltage having a duty ratio equal to 1 is detected as the output signal voltage Vout of the AC voltage abnormality detector 38. The output signal voltage Vout having the pulse signals having the duty ratio equal to 1 indicates that the voltage applied to the AC voltage input section 37 is abnormal.

The controller 39 detects an abnormality of a waveform of the input voltage Vin applied to the AC voltage input section 37 based on the output signal voltage Vout output from the AC voltage abnormality detector 38. As illustrated in FIG. 5, when a power supply which outputs a rectangular wave having the high rising speed is connected to the AC voltage input section 37, a duty ratio of the output signal voltage Vout of the AC voltage abnormality detector 38 becomes greater than a normal range of a duty ratio. Bases on this, the duty ratio of the output signal voltage Vout of the AC voltage abnormality detector 38 is detected, and it is determined whether the detected duty ratio is within the normal range of the duty ratio. Accordingly, the rectangular wave AC voltage can be detected as an abnormality of a waveform of the power supply by the controller 39 based on the determination of the detected duty ratio.

As illustrated in FIG. 6, in a case where the power supply which outputs the DC voltage is connected to the AC voltage input section 37, the duty ratio of the output signal voltage Vout of the AC voltage abnormality detector 38 becomes equal to 1. Accordingly, it is determined that the duty ratio corresponding to an occurrence cycle of the pulse signals of the output signal voltage Vout of the AC voltage abnormality detector 38 is within the normal range of the duty ratio, and the DC voltage can be detected as the abnormality of the waveform of the power supply by the controller 39 based on the determination of the detected duty ratio.

3. Operation of Image Forming Apparatus

Figure 7:
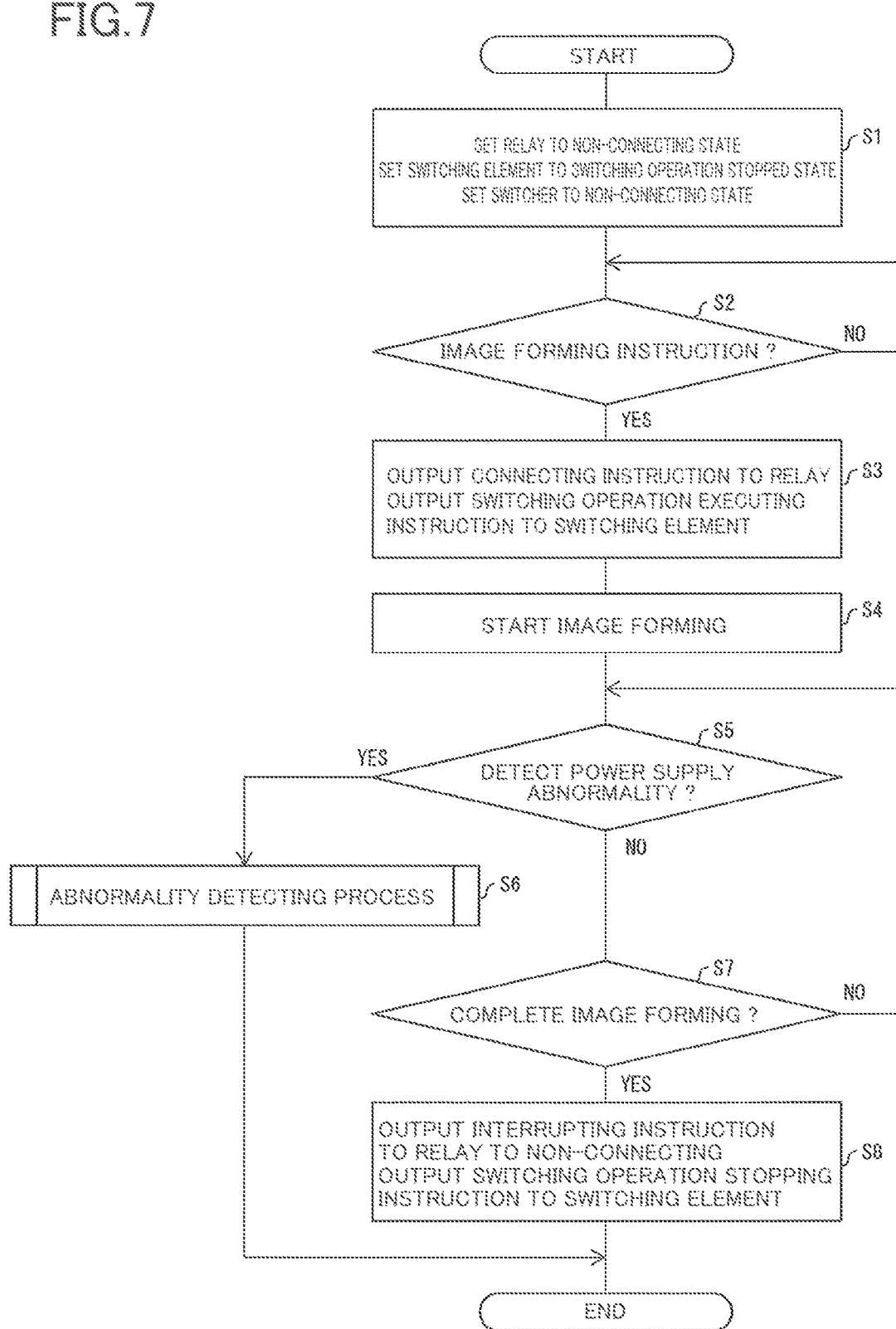
FIG. 7 is a flowchart representing an operation of the image forming apparatus according to the first embodiment.

There will be explained below characteristic operations of the image forming apparatus 1. When the image forming apparatus 1 is turned on, the controller 39 executes a flow of operations illustrated in a flow chart in FIG. 7. The operations of the image forming apparatus 1 will be explained below with reference to the flow chart in FIG. 7.

At S1, the controller 39 sets initial states which are states at a time point when the image forming apparatus 1 is turned on. At the time point when the image forming apparatus 1 is turned on, the relay 33 is set to a non-connecting state, the switching element 34 is set to a switching-operation stopped state, and the switcher 35 is set to a non-connecting state. In this state, an electrical current does not flow into the heater 31, and the heater 31 does not generate heat.

At S2, the controller 39 determines whether an image forming instruction is output. It is determined that the image forming instruction is output (S2:YES), this flow goes to S3. It is determined that the image forming instruction is not output (S2:NO), the controller 39 waits at S2 until the image forming instruction is output.

At S3, the controller 39 outputs a connecting instruction for switching the relay 33 from the non-connecting state to a connecting state. As a result, the relay 33 becomes the connecting state. Also at S3, the controller 39 outputs a switching-operation executing instruction, and the controller 39 causes the switching element 34 to execute the switching operation. As a result, an electrical current flows through the heater 31, and the heater 31 generates heat. Next, this flow goes to S4.

Since the fixing roller 22 is heated by the heater 31 and it becomes a state in which toner can be fixed on the sheet 5, the image forming apparatus 1 starts image forming at S4. Next, this flow goes to S5.

At S5, the controller 39 determines whether an abnormality of the power supply is detected. The controller 39 detects the abnormality of the power supply based on a determination whether the above-explained duty ratio of the pulse signals of the output signal voltage Vout of the AC voltage abnormality detector 38 is within the normal range of the duty ratio. When it is determined that the controller 39 detects the abnormality of the power supply (S5:YES), this flow goes to S6. When it is determined that the controller 39 does not detect the abnormality of the power supply (S5: NO), this flow goes to S7.

Since the abnormality of the power supply is detected, the controller 39 executes an abnormality detecting process at S6. By executing the abnormality detecting process, an abnormal electrical current does not flow to the heater 31. Accordingly, safety of the image forming apparatus 1 is maintained. Next, this flow of the image forming apparatus 1 ends.

At S7, the controller 39 determines whether the image forming is completed. When it is determined that the image forming is completed (S7:YES), this flow goes to S8. When it is determined that the image forming is not completed (S7:NO), this flow returns to S5.

At S8, the controller 39 outputs an interrupting instruction for switching the relay 33 from the connecting state to the non-connecting state, and the controller 39 switches the relay 33 to the non-connecting state. Also at S8, the controller 39 outputs a switching-operation stopping instruction, and the controller 39 stops the switching operation of the switching element 34. That is, a turn-on of the switching element 34 (triac) is not performed. Then, this flow of the image forming apparatus 1 ends.

4. Abnormality Detecting Process

Figure 8:
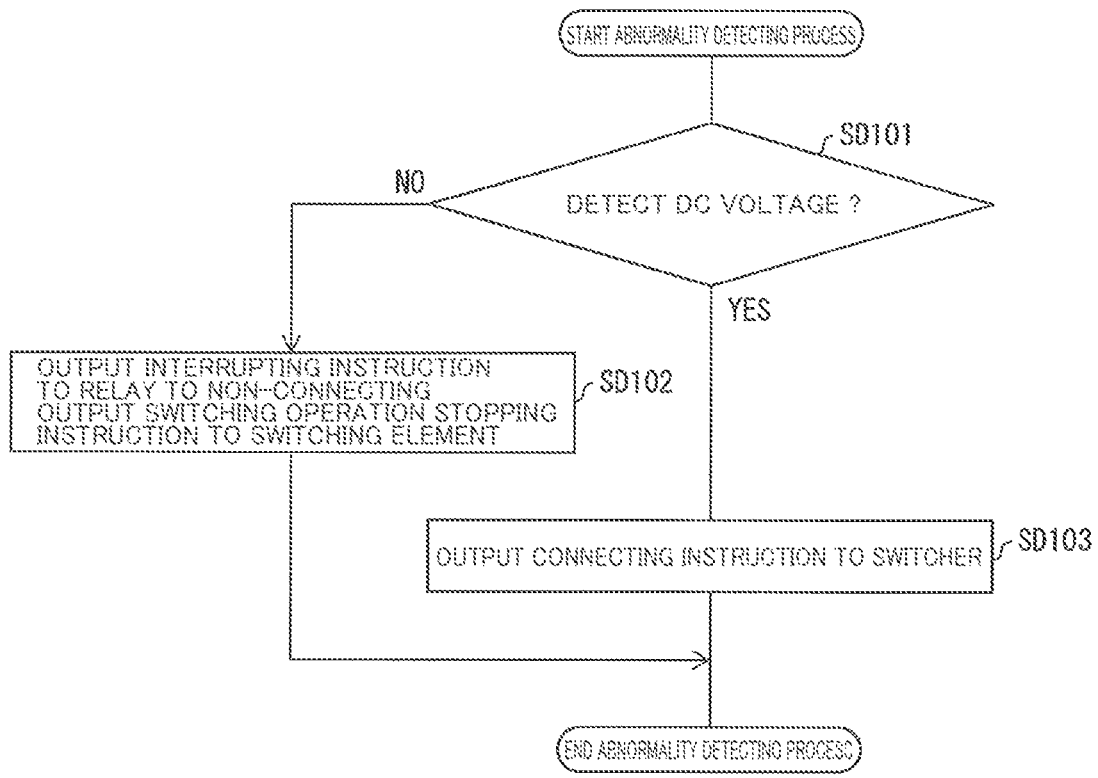
FIG. 8 is a flowchart representing an abnormality detecting process according to the first embodiment.

FIG. 8 illustrates a flow chart representing the abnormality detecting process executed by the image forming apparatus 1. The abnormality detecting process illustrated in FIG. 8 is a subroutine in the flow chart performing the image forming operations of the image forming apparatus 1 illustrated in FIG. 7. The abnormality detecting process will be explained below with reference to the flow chart in FIG. 8.

At S5 in a main flow chart, it is determined that the controller 39 detects the abnormality of the power supply based on the duty ratio of the output signal voltage Vout of the AC voltage abnormality detector 38. At SD101, it is further determined whether the AC voltage abnormality detector 38 detects the DC voltage. The controller 39 determines whether the power supply is the DC voltage based on a determination whether the duty ratio of the output signal voltage Vout of the AC voltage abnormality detector 38 is equal to 1. When it is determined that the power supply is not the DC voltage (SD101:NO), this flow goes to SD102. When it is determined that the power supply is the DC voltage (SD101:YES), this flow goes to SD103.

At SD102, the controller 39 outputs the interrupting instruction for switching the relay 33 from the connecting state to the non-connecting state. Since an AC current has flown through the relay 33, the relay 33 can be interrupted without welding a contact of the relay 33, and the relay 33 becomes the non-connecting state. Also at SD102, the controller 39 outputs the switching-operation stopping instruction to the switching element 34. That is, the turn-on of the switching element 34 (triac) is not performed. Since the AC voltage is applied to the switching element 34, the switching element 34 (triac) becomes an OFF state. Next, the subroutine representing the abnormality detecting process ends, and this flow returns to the main flow chart.

At SD103, the controller 39 outputs a connecting instruction for switching the switcher 35 from the non-connecting state to a connecting state, and the controller 39 switches the switcher 35 to the connecting state. As a result of this, between the first input terminal A1 and the second input terminal A2 of the AC voltage input section 37 of the heating device 30 is short-circuited through the fuse 36 by the switcher 35. When an electric current more than a rated current flows through the fuse 36 from the power supply, the fuse 36 fuses and cuts. As a result, an electrical current does not flow to the heating device 30. Then, the flow chart representing the abnormality detecting process ends, and this flow returns to the main flow chart.

Based on a determination at SD101, a control methods in a case where the input voltage Vin is the DC voltage is distinguished from a control method in a case where the input voltage Vin is the AC voltage. The reason is that, in the case where the input voltage is the DC voltage, the contact of the relay 33 is welded by an arc discharge and the electrical current continues to flow through the heating device 30 even though the controller 39 outputs the interrupting instruction for switching the relay 33 from the connecting state to the non-connecting state. Also, the reason is that, in the case where the input voltage is the DC voltage, the switching element 34 (triac) cannot turn off even though the controller 39 outputs the switching-operation stopping instruction to the switching element 34.

On the contrary, in the case where the input voltage Vin is the AC voltage, the contact of the relay 33 does not weld and the relay 33 is switched to the non-connecting state when the controller 39 outputs the interrupting instruction for switching the relay 33 from the connecting state to the non-connecting state. As a result, the electrical current flowing to the heater 31 is interrupted. Similarly, in the switching element 34, in the case where the input voltage is the AC voltage, the switching element 34 (triac) is turned off when the controller 39 outputs the switching-operation stopping instruction, that is, the switching element 34 is not instructed to be turned on, the electrical current flowing to the heater 31 is interrupted.

Effects

In the case where the rectangular wave AC voltage or the DC voltage, these are not the sinusoidal wave voltage, is applied to the AC voltage input section 37, the controller 39 detects the abnormality of the power supply based on the duty ratio of the output signal voltage Vout of the AC voltage abnormality detector 38. In the case where the power supply is the rectangular wave AC voltage, the controller 39 outputs the interrupting instruction for switching the relay 33 of the heating device 30 from the connecting state to the non-connecting state, and the controller 39 switches the relay 33 to the non-connecting state. The controller 39 outputs the switching-operation stopping instruction to the switching element 34, and the controller 39 stops the switching operation of the switching element 34.

As a result of this, since the heating device 30 can interrupt the electrical current flowing to the heater 31, it is possible to increase safety of the image forming apparatus 1.

In the case where the power supply is the DC voltage, the controller 39 outputs the connecting instruction for switching the switcher 35 of the heating device 30 from the non-connecting state to the connecting state, and the controller 39 switches the switcher 35 to the connecting state.

As a result of this, between the first input terminal A1 and the second input terminal A2 of the AC voltage input section 37 of the heating device 30 is short-circuited through the fuse 36 by the switcher 35, and the fuse 36 fuses and cuts. Accordingly, the electrical current flowing to the heater 31 can be interrupted, and it is possible to increase the safety of the image forming apparatus 1.

Modification of First Embodiment

Figure 9:
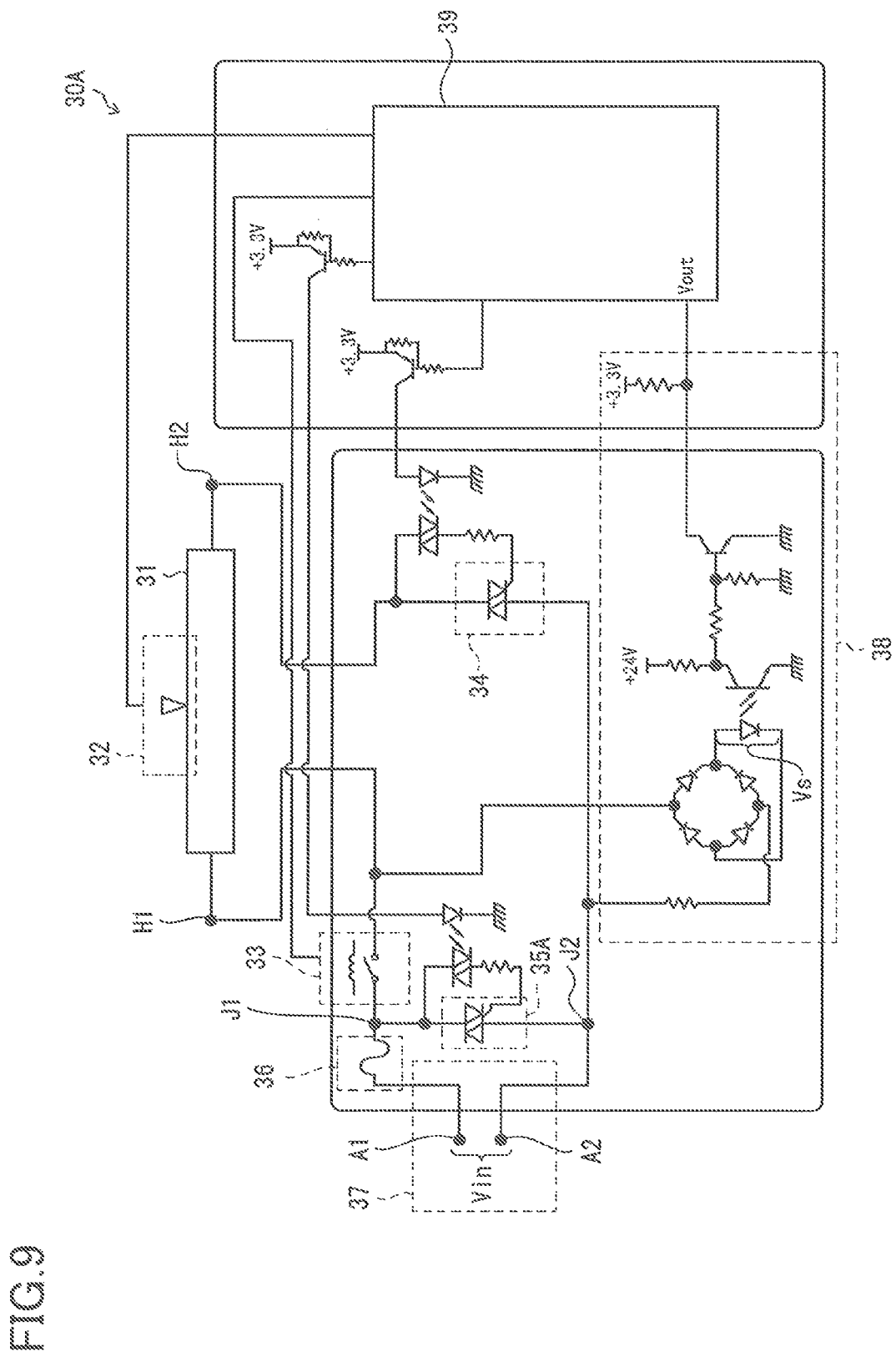
FIG. 9 is a view of a heating device according to a modification of the first embodiment.

FIG. 9 illustrates a configuration of a heating device 30A that is a modification of the first embodiment. A Difference between the modification and the first embodiment is that the switcher 35A consists of a triac. Also in a case where the switcher 35A is the triac, operations of the image forming apparatus 1 of the first embodiment are the same as operations of the modification except for the following points. Non-connecting states of the switcher 35A at S1 of the operations of the image forming apparatus 1 and at SD103 in the abnormality detecting process correspond to a state in which switching operation of the triac is stopped. A connecting state of the switcher 35A corresponds to a state in which the switching operation of the triac is performed.

Second Embodiment

There will be explained below other embodiments of the present disclosure. It is noted that the same reference numerals as used in the first embodiment are used to designate the corresponding elements of a second embodiment, and an explanation of which is dispensed with.

Figure 10:
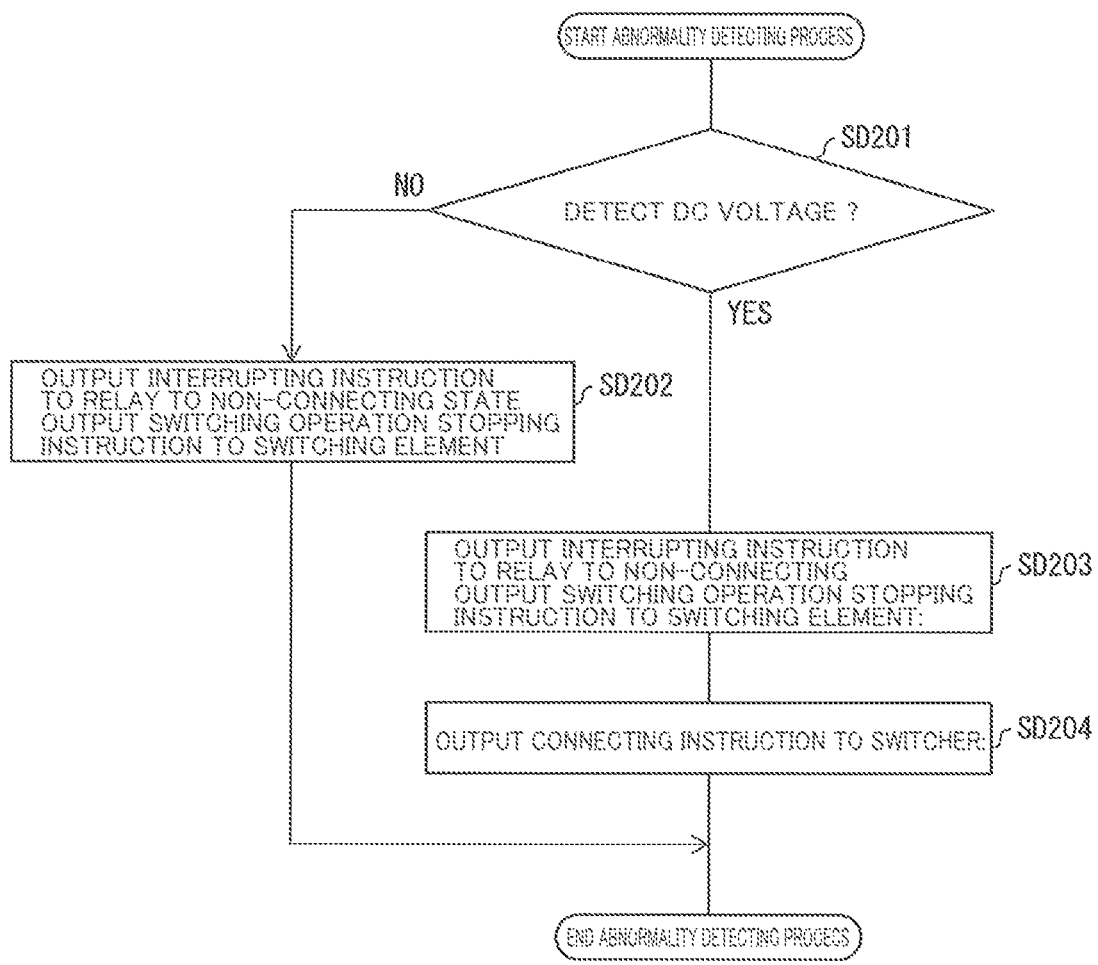
FIG. 10 is a flowchart representing an abnormality detecting process according to a second embodiment.

An abnormality detecting process of the second embodiment differs from that of the first embodiment, however, other points except for the abnormality detecting process are the same. FIG. 10 is a flow chart related to the second embodiment and representing the abnormality detecting process executed by the image forming apparatus 1. The abnormality detecting process illustrated in FIG. 10 is a subroutine in the flow chart performing the image forming operations of the image forming apparatus 1 illustrated in FIG. 7. There will be explained below the abnormality detecting process with reference to the flow chart in FIG. 10.

At SD201, the controller 39 determines whether the AC voltage abnormality detector 38 detects the DC voltage. When it is determined that the DC voltage is not detected (SD201:NO), this flow goes to SD202. When it is determined that the DC voltage is detected (SD:YES), this flow goes to SD203.

At SD202, the controller 39 outputs the interrupting instruction for switching the relay 33 from the connecting state to the non-connecting state. Since the AC current has flown through the relay 33, the relay 33 can be interrupted without welding the contact of the relay 33, and the relay 33 becomes the non-connecting state. Also at SD202, the controller 39 outputs the switching-operation stopping instruction to the switching element 34. That is, the turn-on of the switching element 34 (triac) is not performed. Since the AC voltage has been applied to the switching element 34, the switching element 34 (triac) is turned off. Next, the subroutine of the abnormality detecting process ends, and this flow returns to the main flow.

At SD203, the controller 39 outputs the interrupting instruction for switching the relay 33 from the connecting state to the non-connecting state. It is noted that there is a possibility that the contact of the relay 33 is welded by an arc discharge and the relay 33 remains in the connecting state even though the controller 39 outputs the interrupting instruction. Also at SD 203, the controller 39 outputs the switching-operation stopping instruction to the switching element 34. That is, the turn-on of the switching element 34 (triac) is not performed. Since the DC voltage has been applied to the switching element 34, if the relay 33 remains in the connecting state, the switching element 34 (triac) cannot be turned off. As a result, the electrical current continues to flow through the heater 31

At SD204, the controller 39 outputs the connecting instruction to the switcher 35 for switching the switcher 35 to the connecting state. As a result of this, the switcher 35 becomes the connecting state and the fuse 36 fuses and cuts. Next, the subroutine of the abnormality detecting process ends, and this flow returns to the main flow.

Effects

In the case where the rectangular wave AC voltage or the DC voltage, these are not the sinusoidal wave voltage, is applied to the AC voltage input section 37, the controller 39 detects the abnormality of the power supply based on the duty ratio of the output signal voltage Vout of the AC voltage abnormality detector 38. In the case where the power supply is the rectangular wave AC voltage, the controller 39 outputs the interrupting instruction for switching the relay 33 of the heating device 30 from the connecting state to the non-connecting state, and the controller 39 switches the relay 33 to the non-connecting state. The controller 39 outputs the switching-operation stopping instruction to the switching element 34, and the controller 39 stops the switching operation of the switching element 34.

As a result of this, since the heating device 30 can interrupt the electrical current flowing to the heater 31, it is possible to increase safety of the image forming apparatus 1.

In the case where the input voltage Vin is the DC voltage, the controller 39 outputs the interrupting instruction to the relay 33 for switching the relay 33 from the connecting state to the non-connecting state. Even in a case where the contact of the relay 33 is welded by the arc discharge caused by the interrupting instruction and in a case where the contact of the relay 33 is not welded by the interrupting instruction, the controller 39 outputs the connecting instruction for switching the switcher 35 of the heating device 30 from the non-connecting state to the connecting state, and the controller 39 switches the switcher 35 to the connecting state. Similarly for the switching element 34, the controller 39 outputs the switching-operation stopping instruction to the switching element 34. Even in a case where the switching element 34 (triac) can be turned off by the instruction and in a case where the switching element 34 cannot be turned off by the instruction, the controller 39 outputs the connecting instruction for switching the switcher 35 of the heating device 30 from the non-connecting state to the connecting state, and the controller 39 switches the switcher 35 to the connecting state.

As a result of this, between the first input terminal A1 and the second input terminal A2 of the AC voltage input section 37 of the heating device 30 is short-circuited through the fuse 36 by the switcher 35, and the fuse 36 fuses and cuts. Accordingly, the electrical current flowing to the heater 31 can be interrupted, and it is possible to increase the safety of the image forming apparatus 1.

Third Embodiment

There will be explained below other embodiments of the present disclosure. It is noted that the same reference numerals as used in the first embodiment are used to designate the corresponding elements of a third embodiment, and an explanation of which is dispensed with.

Figure 11:
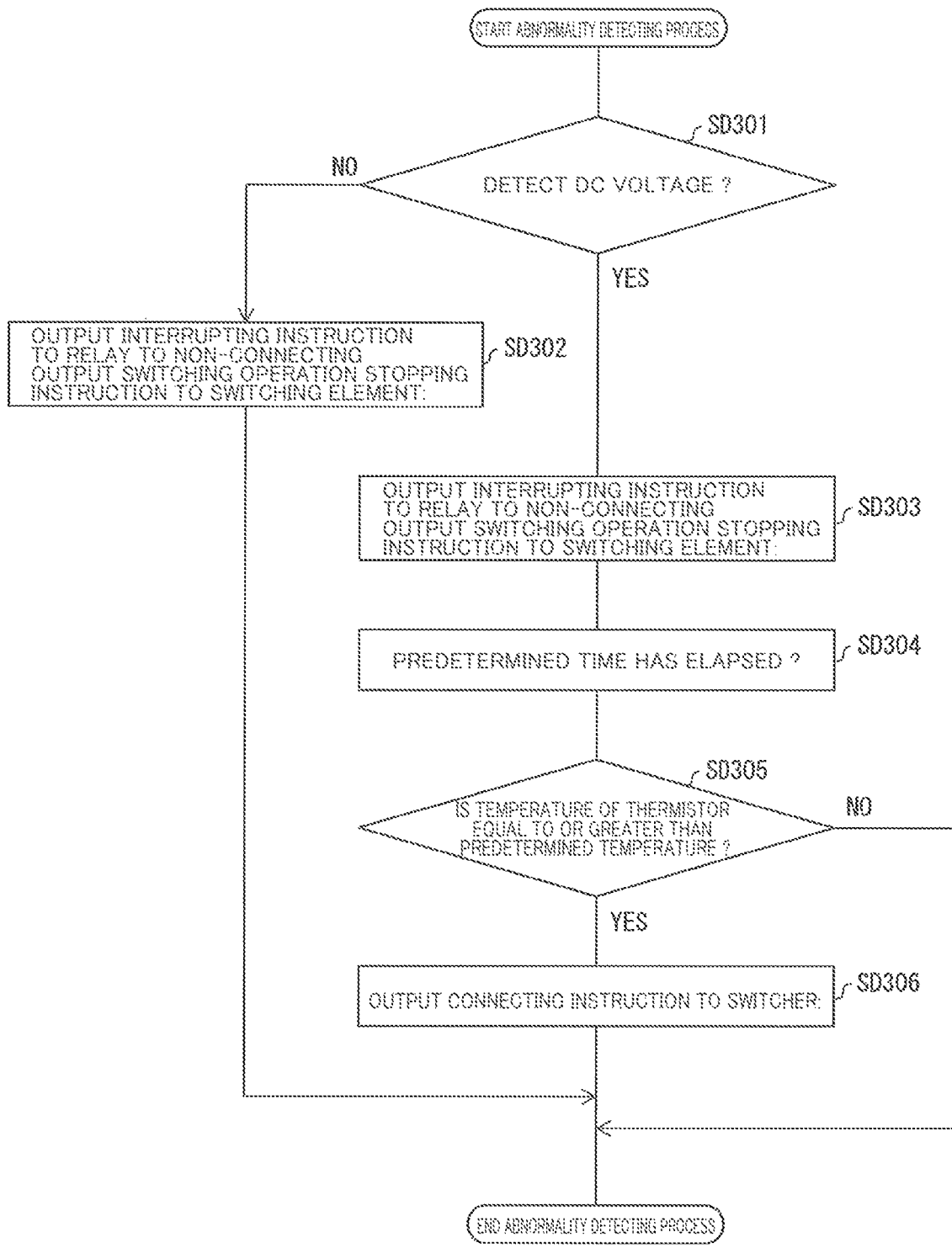
FIG. 11 is a flowchart representing an abnormality detecting process according to a third embodiment.

FIG. 11 is a flow chart related to the third embodiment and representing an abnormality detecting process executed by the image forming apparatus 1. The abnormality detecting process of the third embodiment differs from that of the first embodiment, however, other points except for the abnormality detecting process are the same. The abnormality detecting process illustrated in FIG. 11 is a subroutine in the flow chart performing the image forming operations of the image forming apparatus 1 illustrated in FIG. 7. There will be explained below the abnormality detecting process with reference to the flow chart in FIG. 11.

At SD301, the controller 39 determines whether the DC voltage is detected as the input voltage Vin. When it is determined that the DC voltage is not detected as the input voltage Vin (SD301:NO), this flow goes to SD302. When it is determined that the DC voltage is detected as the input voltage Vin (SD:301:YES), this flow goes to SD303.

At SD302, the controller 39 outputs the interrupting instruction to the relay 33 for switching the relay 33 to the non-connecting state. Since the AC current has flown through the relay 33, the relay 33 can be interrupted without welding the contact of the relay 33, and the relay 33 becomes the non-contacting state. Also at SD302, the controller 39 outputs the switching-operation stopping instruction to the switching element 34. That is, the turn-on of the switching element 34 (triac) is not performed. Since the AC voltage has been applied to the switching element 34, the switching element 34 (triac) is turned off. Next, the subroutine of the abnormality detecting process ends, and this flow returns to the main flow.

At SD303, the controller 39 outputs the interrupting instruction to the relay 33 for switching the relay 33 to the non-connecting state. Also at SD303, the controller 39 outputs the switching-operation stopping instruction to the switching element 34. Next, this flow goes to SD304.

The controller 39 waits at SD304 until a predetermined time has elapsed. At SD304, the electrical current continues to flow through the heater 31, and next this flow goes to SD305.

At SD305, the controller 39 determines whether a temperature of the thermistor 32 is equal to or greater than a predetermined temperature. When it is determined that the temperature of the thermistor 32 is equal to or greater than the predetermined temperature (SD:YES), this flow goes to SD306. When it is determined that the temperature of the thermistor 32 is less than the predetermined temperature (SD305:NO), the flow of the abnormality detecting process ends, and this flow returns to the main flow. The reason why the flow of the abnormality detecting process ends is that it is determined that the electrical current flowing to the heater 31 is stopped by processing executed at SD303.

At SD 306, in a case where the electrical current flowing to the heater 31 is not stopped by the processing executed at SD303, a state of the heater 31 is maintained at a temperature that is equal to or greater than the predetermined temperature, this flow goes to SD306. The controller 39 outputs the connecting instruction for switching the switcher 35 from the non-connecting state to the connecting state, and the controller 39 switches the switcher 35 to the connecting state. As a result, the fuse 36 fuses and cuts, and the electrical current flowing to the heater 31 is interrupted. Next, the subroutine of the abnormality detecting process ends, and this flow returns to the main flow.

Effects

According to the third embodiment, even though the DC voltage is applied to the AC voltage input section 37, the controller 39 outputs the interrupting instruction for switching the relay 33 from the connecting state to the non-connecting state, or the switching-operation stopping instruction for stopping the switching-operation of the switching element 34. Then, the controller 39 determines whether the electrical current flowing to the heater 31 is stopped based on the temperature of the heater 31 as the temperature of the thermistor 32. In a case where the electric current flowing to the heater 31 is stopped due to the interrupting instruction or the switching-operation stopping instruction, the fuse 36 is not fused and cut. Accordingly, it is possible to increase the safety of the image forming apparatus 1 without fusing and cutting the fuse 36.

Examples Achieved by Software

A control block (especially, the controller 39) of the heating device 30 may be achieved with a logic circuit (hardware) formed on an integrated circuit (an IC chip) and the like, or may be achieved with software.

In a case of the latter, the heating device 30 comprises a computer configured to execute instructions of a program which is the software achieves various kinds of functions. This computer comprises, for example, at least one processor and a storage medium storing the program and readable by the computer. In the computer, the processor reads the program from the storage medium and executes the program. As a result, objects of the present disclosure are implemented.

A CPU (Central Processing Unit) can be used as the processor. As the storage medium, "a non-transitory tangible medium", for example, a ROM (Read Only Memory) and the like, a tape, a disc, a card, a semiconductor memory, a programmable logic circuit and the like can be used. The heating device 30 may further comprise a RAM (Random Access Memory) in which the program is developed, and the like. The program may be transmitted to the computer via an arbitrary transmission medium (a communication network and a broadcast wave and the like) capable of transmitting the program. It is noted that one embodiment of the present disclosure can be achieved with a form of data signals in which the program is embodied by an electrical transmission and contained in a carrier wave.

While the embodiments have been described above, it is to be understood that the disclosure is not limited to the details of the illustrated embodiments, but may be embodied with various changes, combinations, and modifications, which may occur to those skilled in the art, without departing from the spirit and scope of the disclosure.

What is claimed is:

1. A heating device, comprising:
  a heater disposed between a first terminal and a second terminal and configured to generate heat by an electrical current flowing between the first terminal and the second terminal;
  an AC-voltage input section having a first input-terminal and a second input-terminal between which an AC voltage is applied;
  a fuse disposed between the first terminal and the first input-terminal;
  a switcher disposed between a first connecting point and a second connecting point and configured to switch connection of the first connecting point to the second connecting point between a connecting state and a non-connecting state, the first connecting point being located between the first terminal of the heater and the fuse, the second connecting point being located between the second terminal of the heater and the second-input terminal;
an AC-voltage-abnormality detector configured to detect an abnormality of the AC voltage, the AC-voltage-abnormality detector detecting a situation in which a DC voltage is applied to the AC-voltage-input section; and
a controller configured to execute a current-flowing operation in a state in which the connection of the first connecting point to the second connecting point is the non-connecting state, the current-flowing operation being an operation in which the electrical current flows through the heater,
wherein the controller is configured to execute a connecting process in response to detection of the abnormality of the AC voltage by the AC-voltage-abnormality detector detected in the middle of the current-flowing operation, the connecting process being a process of switching the connection of the first connecting point to the second connecting point from the non-connecting state to the connecting state.

2. The heating device according to claim 1, further comprising a relay disposed between the first terminal of the heater and the first connecting point and configured to switch connection of the first terminal to the first connecting point between a connecting state and a non-connecting state,
wherein the controller is configured to
execute the current-flowing operation in a state in which the connection of the first terminal of the heater to the first connecting point is the connecting state switched by the relay, and
before executing the connecting process, output an interrupting instruction to the relay in response to the detection of the abnormality of the AC voltage by the AC-voltage-abnormality detector detected in the middle of the current-flowing operation, the interrupting instruction causing the relay to switch the connection of the first terminal to the first connecting point from the connecting state to the non-connecting state.

3. The heating device according to claim 1, further comprising a switching element disposed between the second terminal of the heater and the second connecting point and configured to execute a switch operation,
wherein the controller is configured to
control the switching element to execute the switch operation so as to execute the current-flowing operation, and
before executing the connecting process, instruct the switching element to stop the switching operation in response to the detection of the abnormality of the AC voltage by the AC-voltage-abnormality detector detected in the middle of the current-flowing operation.

4. The heating device according to claim 3, further comprising a thermistor configured to detect a temperature of the heater,
wherein the controller is configured to determine whether the detected temperature of the heater is equal to or greater than a predetermined temperature, in response to the detection of the abnormality of the AC voltage by the AC-voltage-abnormality detector detected in the middle of the current-flowing operation, and the controller is configured to execute the connecting process when the controller determines that the detected temperature of the heater is equal to or greater than the predetermined temperature.

5. The heating device according to claim 4, wherein, (a) after a timing of output of the interrupting instruction, or (b) after a predetermined time has elapsed after instructing to stop the switching operation, the controller is configured to execute the determination of determining whether the detected temperature of the heater is equal to or greater than the predetermined temperature.

6. The heating device according to claim 2, wherein a situation in which a voltage applied to the AC-voltage-input section is determined an abnormal situation includes a situation in which a DC voltage is applied to the AC-voltage input section, and
wherein the controller is configured to output, to the relay, an instruction for switching the connection of the first terminal of the heater to the first connecting point to the non-connecting state in response to determination of an abnormal situation of the AC-voltage-input section other than the abnormal situation of applying of DC voltage in the middle of the current-flowing operation.

7. The heating device according to claim 3, wherein a situation in which a voltage applied to the AC-voltage-input section is determined an abnormal situation includes a situation in which a DC voltage is applied to the AC-voltage input section, and
wherein the controller is configured to instruct the switching element to stop the switching operation in response to determination of an abnormal situation of the AC-voltage-input section other than the abnormal situation of applying of DC voltage in the middle of the current-flowing operation in the middle of the current-flowing operation.

8. The heating device according to claim 1, wherein a situation in which a voltage applied to the AC-voltage-input section is determined an abnormal situation includes a situation in which a DC voltage is applied to the AC-voltage input section, and
wherein the controller is configured to execute the connecting process in response to determination of the abnormal situation of applying of the DC voltage to the AC-voltage-input section in the middle of the current-flowing operation.

9. The heating device according to claim 1, wherein the switcher comprises at least one relay component.

10. The heating device according to claim 1, wherein the switcher comprises a triac.

11. An image faulting apparatus, comprising:
a process unit configured to form a developer image on a recorded medium based on image data;
a heating device including: a heater disposed between a first terminal and a second terminal and configured to generate heat by an electrical current flowing between the first terminal and the second terminal; an AC-voltage input section having a first input-terminal and a second input-terminal between which an AC voltage is applied; a fuse disposed between the first terminal and the first input-terminal; a switcher disposed between a first connecting point and a second connecting point and configured to switch connection of the first connecting point to the second connecting point between a connecting state and a non-connecting state, the first connecting point being located between the first terminal of the heater and the fuse, the second connecting point being located between the second terminal of the heater and the second-input terminal;

an AC-voltage-abnormality detector configured to detect an abnormality of the AC voltage, the AC-voltage-abnormality detector detecting a situation in which a DC voltage is applied to the AC-voltage-input section;

a controller; and a fixing device configured to fix the developer image formed by the process unit on the recorded medium by heat generated by the heating device, wherein the controller is configured to execute a current-flowing operation in a state in which the connection of the first connecting point to the second connecting point is the non-connecting state, the current-flowing operation being an operation in which the electrical current flows through the heater, and wherein the controller is configured to execute a connecting process in response to detection of the abnormality of the AC voltage by the AC-voltage-abnormality detector detected in the middle of the current-flowing operation, the connecting process being a process of switching the connection of the first connecting point to the second connecting point from the non-connecting state to the connecting state.

\* \* \* \* \*

UNITED STATES PATENT AND TRADEMARK OFFICE
CERTIFICATE OF CORRECTION

| | | |
|---|---|---|
| PATENT NO. | : 11,609,520 B2 | Page 1 of 1 |
| APPLICATION NO. | : 17/412333 | |
| DATED | : March 21, 2023 | |
| INVENTOR(S) | : Naoya Yada | |

It is certified that error appears in the above-identified patent and that said Letters Patent is hereby corrected as shown below:

In the Claims

<u>Claim 11, Column 16, Line 48:</u>
Please change: "An image faulting apparatus, comprising:" to -- An image forming apparatus, comprising --

Signed and Sealed this
Third Day of October, 2023

Katherine Kelly Vidal
*Director of the United States Patent and Trademark Office*